United States Patent [19]

Ettel

[11] Patent Number: 4,473,718
[45] Date of Patent: Sep. 25, 1984

[54] SELF-ACTUATING TELEPHONE TIMER
[76] Inventor: Victor A. Ettel, 3282 Charmaine Hts., Mississauga, Ontario, Canada
[21] Appl. No.: 493,669
[22] Filed: May 11, 1983
[51] Int. Cl.³ .............................................. H04M 1/21
[52] U.S. Cl. ..................................... 179/2 TC; 368/4
[58] Field of Search ............... 179/2 TC, 6.31, 7.1 R, 179/7.1 TP; 368/4, 13, 319–321

[56] References Cited

U.S. PATENT DOCUMENTS

| 2,609,045 | 9/1952 | Kaiser | 368/4 |
| 3,512,355 | 5/1970 | Lang | 368/13 X |
| 4,088,839 | 5/1978 | Stein, Jr. | 368/13 X |
| 4,260,855 | 4/1981 | Rubinstein | 179/2 TC X |

FOREIGN PATENT DOCUMENTS 1549165  7/1979  United Kingdom ................... 368/4

Primary Examiner—Gene Z. Rubinson
Assistant Examiner—W. J. Brady

[57] ABSTRACT

According to the present invention a timing device for use with a telephone having a hand held receiver/transmitter replacable on the phone when not in use, is disclosed.

The timing device includes a battery operated self zeroing liquid crystal display clock module provided with a normally closed switch. A feeler arm for activation of the clock module is provided which controls the position of the switch and biasing is provided for urging the switch and the feeler arm to close the switch and operate the clock module when no external forces are provided on the feeler arm. The feeler arm is secured within the timing device in a manner whereby a force of sufficient magnitude at the free end of the feeler arm in a direction generally opposed to the direction of the biasing device, causes the arm to open the switch, disconnecting the battery from the clock module. The feeler arm allows the timing device, to be secured to a phone in a convenient location with the free end of the feeler arm being positionable to be engaged by a component of the phone which forces the feeler arm to open the switch when the receiver/transmitter is hung on the phone.

11 Claims, 7 Drawing Figures

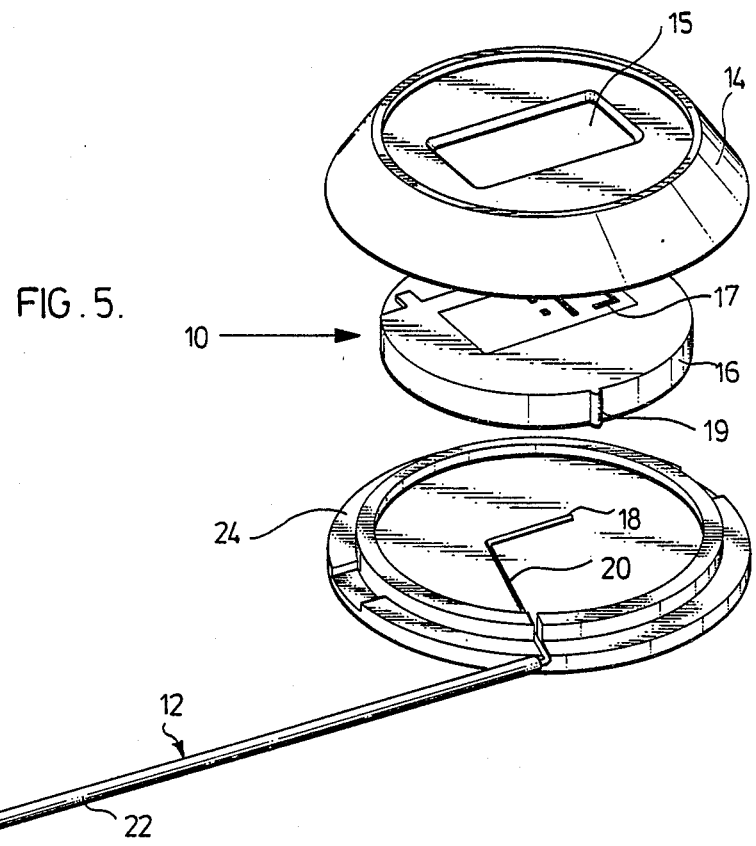
FIG. 5.
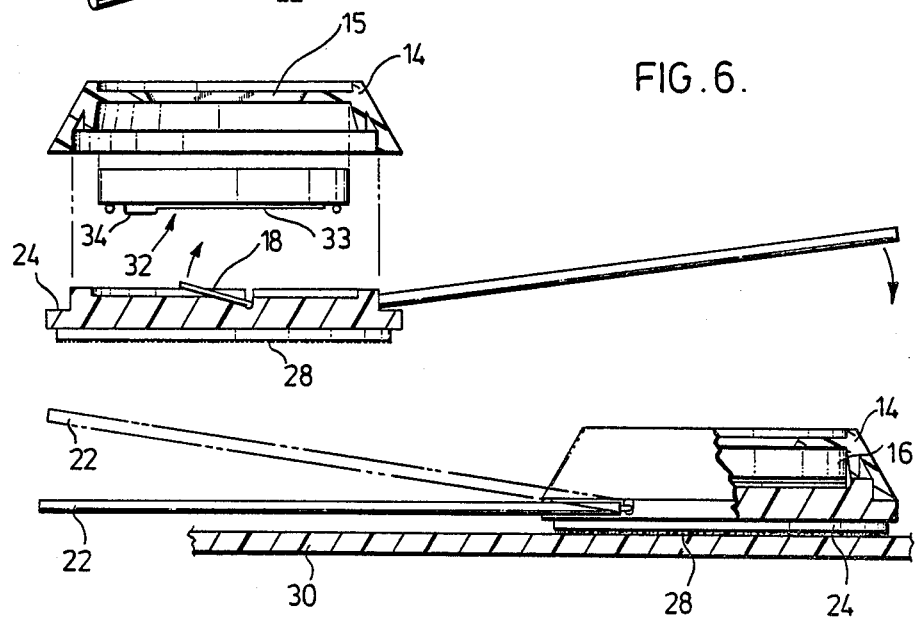
FIG. 6.
FIG. 7.

SELF-ACTUATING TELEPHONE TIMER

FIELD OF THE INVENTION

The present invention relates to timing devices for use on telephones and in particular relates to a timing device having a structure which allows the device to be adapted for use with phones of different configurations.

BACKGROUND OF THE INVENTION

In recent years, liquid crystal display clock modules have gained wide acceptance in the market place and are used extensively for wrist watches, stop watches, etc.. It is also possible to buy what is referred to as a self zeroing liquid crystal display clock module which always returns to zero after the source of power is interrupted. Such a self zeroing liquid crystal clock module is advantageously employed in the present invention.

Both in the business environment as well as in the home household use, it is often desirable to time the approximate length of telephone calls from both an interest point of view as well as in an effort to keep the telephone charges within a predetermined limit. To-date, a simple inexpensive timing device has not been available which is adaptable for use on the various styles of telephones now commonly used throughout North America. Although specialized timing devices may have been developed for specific applications, there is still a need for a timing device which due to its inherent structure is adaptable for securement to telephones of varying types to allow the approximate timing of telephone calls.

The present invention provides one such flexible time piece, which is secureable to different models of telephones and allows the approximate timing of telephone calls.

SUMMARY OF THE INVENTION

A timing device according to the present invention is for securement to telephones having a hand held receiver/transmitter replacable on the phone when not in use and hand held when in use. The timing device includes a battery operated self zeroing crystal display clock module having a means for selectively activating and deactivating the clock module. A feeler arm for activation of the clock module by controlling the selecting means and including biasing means for urging the feeler arm to operate the clock module are provided. The feeler arm is secured within the timing device in a manner whereby a force of sufficient magnitude at the free end of the feeler arm, in a direction generally opposed to the direction of the biasing means, causes the arm to move and deactivate the clock module. The feeler arm allows the timing device to be secured to a phone in a convenient location with the free end of the feeler arm being positionable to be engaged by a component of the phone which forces the feeler arm to deactivate the module when the receiver/transmitter is in position on the phone and allows the arm to move under the influence of the biasing means to activate the module when the receiver/transmitter is removed for use. This thereby allows the timing of the approximate length of the call until the receiver/transmitter is returned to the phone.

BRIEF DESCRIPTION OF THE DRAWINGS

Preferred embodiments of the drawings are found in the drawings wherein;

FIG. 5 is an exploded perspective view of the timing device;

FIG. 6 is an exploded cross-section through the timing device; and

FIG. 7 is a side elevation which is partially cut away showing the timing device and the movable feeler arm.

DETAILED DESCRIPTION OF THE PREFERRED EMBODIMENTS

Figure 1:
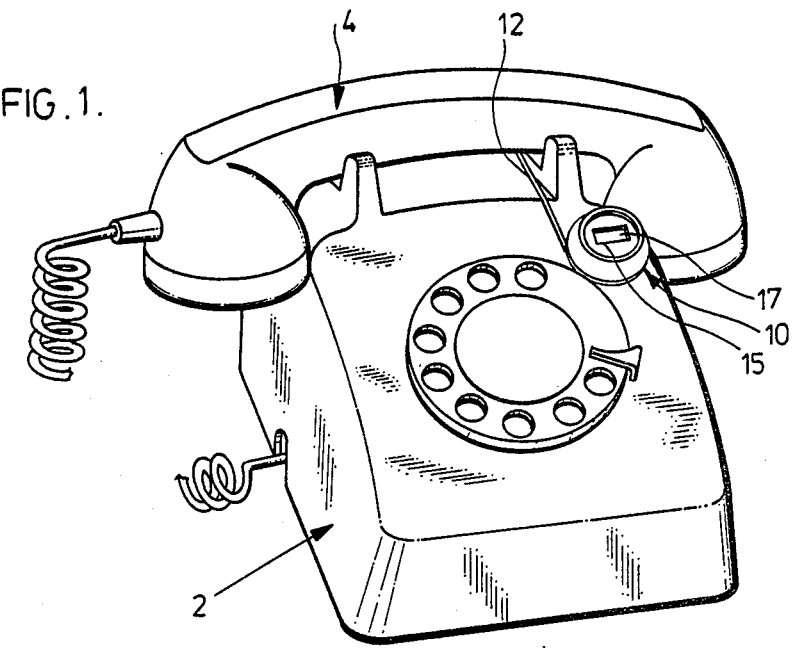
FIG. 1 is a perspective view of a telephone with the timimg device secured thereon.
Figure 2:
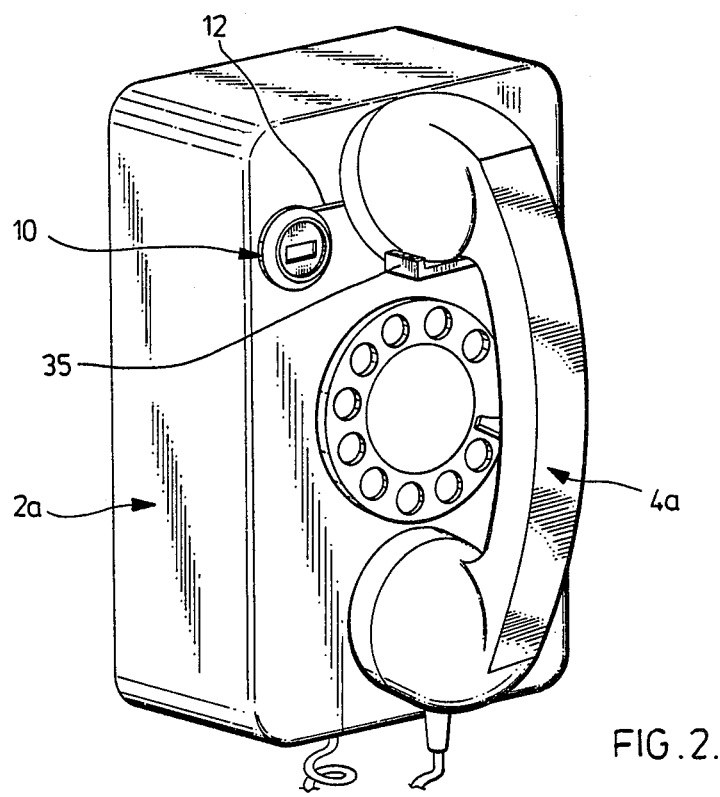
FIG. 2 is a perspective view of a wall mount telephone with the timing device secured thereon.
Figure 3:
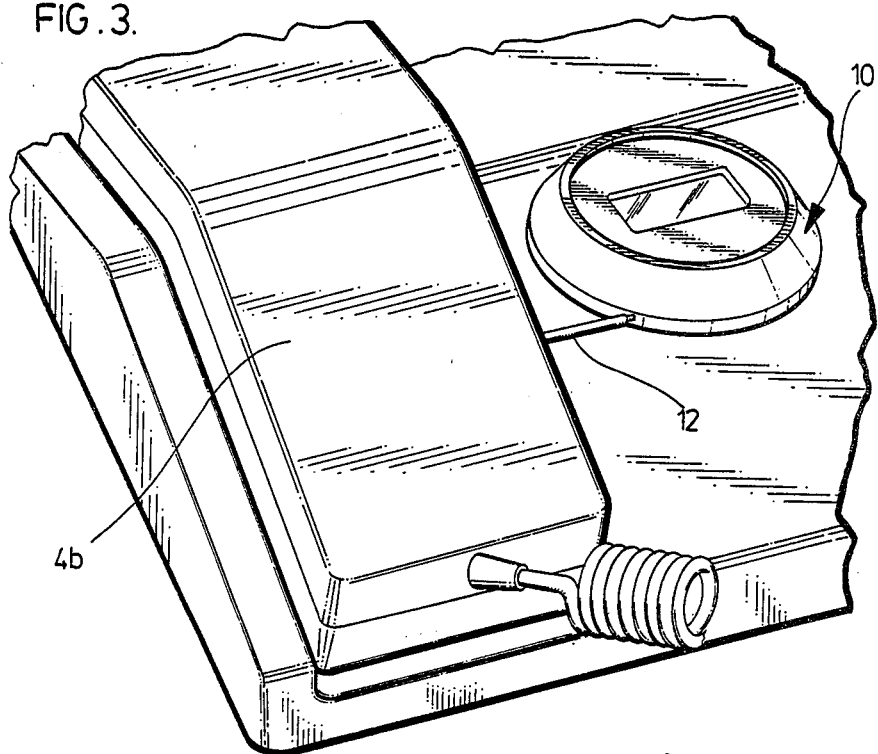
FIG. 3 is a partial perspective view showing the timing device secured to a telephone of a different structure.
Figure 4:
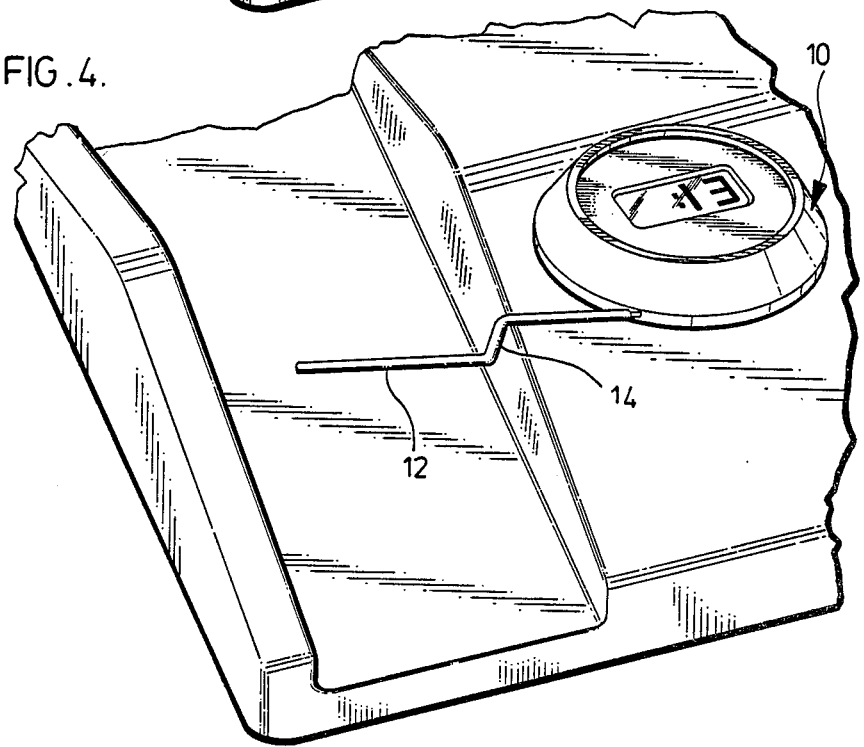
FIG. 4 is view similar to FIG. 3, with the receiver/transmitter shown on the phone of FIG. 3 removed.

As show in FIGS. 1 through 4, the timing device generally shown as 10, can be secured at any convenient area on a telephone 2 and positionable thereon in a manner to allow the feeler arm 12 of the timing device to be engaged by the receiver/transmitter of the telephone, generally shown as 4 to disconnect the source of power from the self zeroing clock module of the timing device. FIG. 2, illustrates how the location of the feeler arm 12 relative to the display window 15 and the digital read out 17 of the clock module can be varied to allow securement on telephones of different structures. The wall telephone 2(a) of FIG. 2 has the timing device 10 secured in a manner whereby the return of the receiver/transmitter 4 (a) on the wall structure causes the cradle 35 to impinge upon the feeler arm 12. Similarly, the return of the receiver/transmitter 4 (b) of FIG. 3, causes the feeler arm 12 to move to one position whereas when the receiver is removed as shown in FIG. 4, the feeler arm 12, due to a spring biasing provided within the timing device, urges the feeler arm to a different position and allows the power source to be connected to the clock module.

The structure of the timing device 10 can be understood from a review of the exploded perspective view of FIG. 5. The timing device includes an upper casing member 14 having a clock readout window 15 and this casing receives the liquid quartz display clock module 16 having the timing display 17. In order to assure alignment of the window 15 with the display 17, a small alignment lug 19 is provided on the clock module which is received within a slot provided within the casing 14. The base member 24 of the timing device hingedly secures feeler arm 12 in that the transverse portion of the feeler arm, generally shown in dotted lines as 20, is hingedly secured within the base unit. The feeler arm has one free end generally designated as 18 which engages the biased pressure switch of the clock module. The opposite end of the feeler arm generally designated as 22 is the portion which is engaged by the receiver/transmitter of a telephone or some other component of the telephone to cause the feeler arm to move when the receiver is returned to the telephone.

In FIG. 7, the end 22 of the feeler arm is shown in two positions, and in the position shown in solid lines, the feeler arm opens the switch of the clock module and would be typical of when the receiver is in place on the telephone. The second position, shown in dotted lines, is the position of the feeler arm when only acted upon by the biasing means of the pressure switch of the liquid crystal clock module and is typical of the feeler arm when the switch is closed and the clock module of the timing device is activated. In FIG. 7 an adhesive 28 is shown securing the timing device to the phone surface 30 and preferrably this adhesive will be of the pressure sensitive type and will include a release paper until the device is to be secured to a telephone.

In a sectional view of FIG. 6, the action of the feeler arm in combination with the pressure sensitive switch 32 of the L C D module can be appreciated. Basically the switch 32 includes two metal contact members which are biased into the conducting position as shown in FIG. 6. In order to deactivate the clock module, the one contact member 33 must be urged by the end 18 of the feeler arm upwardly towards the clock module. This cuts the power to the clock module and deactivates the timer. Member 33 is preferrably a spring biased leaf member and therefor if there is no force on the feeler arm this leaf member will cause the feeler arm to move to the position generally shown in dotted lines in FIG. 7 and activate the clock module. Thus, the pressure sensitive switch 32 provides the biasing means for urging the feeler arm to one position and the feeler arm when acted upon by an external force, caused by the replacement of the receiver/transmitter on the telephone, causes the switch to open as the feeler arm forces the contact leaf spring 33 into a nonconducting position with respect to contact 34.

In order to provide flexibility in locating the timing device on a telephone, the base 24 is rotatable relative to the upper casing 14 and the end portion 18 of the feeler arm at any position of the base relative to the casing when secured therein provides the same action as described above. Therefore, it is possible to position the base relative to the casing 14 in a manner to provide the most convenient location of the feeler arm relative to the telephone, thereby simplifying securement of the device to telephones of varying configurations. In addition, the feeler arm is made of a thin gauge spring wire which can be bent as examplified in FIG. 4 to further facilitate use of the timing device with telephone of varying structures.

Although preferred embodiments of the present invention have been described herein in detail, it will be appreciated by those skilled in the art, that variations may be made thereto without departing from the spirit of the invention or the scope or the appended claims.

The embodiments of the invention in which an exclusive property or priviledge is claimed are defined as follows:

1. A self contained timing device for securement on a telephone having a hand held receiver/transmitter replacable on the telephone when not in use and hand held when in use, said timing device including a battery operated liquid crystal display clock module provided with a switch for selectively activating and deactivating said clock module, said clock module when deactivated zeroing said clock module, a feeler arm for controlling said switch and including biasing means for urging said feeler arm and switch to a position activating said clock module, said feeler arm when a force of sufficient magnitude is applied thereto in a direction to generally oppose said biasing means moving said arm to thereby cause said switch to deactivate said clock module, said feeler arm allowing said timing device to be secured to a telephone in a convenient location with said feeler arm being bendable in its length to allow positioning thereof in engagement with a component of said telephone and cause said feeler arm to move and deactivate said clock module when said receiver/transmitter is replaced on said telephone, said arm moving under the influence of said biasing means to activate said clock module when said receiver/transmitter is removed for use, said timing device being housed in a two piece casing having a top portion for receiving said clock module and a base for pivotally securing said feeler arm, said switch being positioned above said base and said feeler arm is secured to have an end therof generally centrally disposed within said base and in contact with said switch, said base being securable to said top portion in a number of positions to allow the position of said feeler arm relative to said top portion to be varied.

2. A timing device as claimed in claim 1, wherein said feeler arm is pivotally secured intermediate the length thereof within the timing device, said biasing means acting on the end of said arm within the device.

3. A timing device as claimed in claim 1, wherein said switch and said biasing means are combined in a pressure sensitive switch mechanism.

4. A timing device as claimed in claim 1, wherein said feeler arm is a thin gauge spring wire.

5. A timing device as claimed in claim 1, wherein said feeler arm is a thin gauge spring wire having two offset arms secured by a transverse portion, said transverse portion being hingedly secured within said timing device to provide a hinge axis.

6. A timing device as claimed in claim 1, including adhesive means for securing said device to a telephone.

7. A timing device as claimed in claim 2, wherein said feeler arm is a thin gauge spring wire to permit bending thereof for adaption to telephones of varying configuration.

8. A timing device as claimed in claim 3, wherein said feeler arm is a thin gauge spring wire to permit bending thereof for adaption to telephones of varying configuration.

9. A timing device as claimed in claim 2, wherein said feeler arm is a thin gauge wire having two offset arms secured by a transverse portion, said transverse portion being hingedly secured within said timing device to provide a hinge axis.

10. A timing device as claimed in claim 3, wherein said feeler arm is a thin gauge wire having two offset arms secured by a transverse portion, said transverse portion being hingedly secured within said timing device to provide a hinge axis.

11. A timing device as claimed in claim 1, wherein said feeler arm includes a hinge axis portion intermediate the length of the arm, said hinge axis portion being secured in said base to extend inwardly from a side edge of said base, said switch being generally centrally disposed within said casing, said arm having an end portion within said casing secured to said hinge axis portion and extending at an angle thereto and in contact with said switch, and an end portion adjacent a side edge of the casing extending at an angle to said hinge axis portion for contact with said receiver/transmitter when said timing device is located on said telephone, said hinge axis portion interconnecting said end portions such that movement of either end portion in a direction causing rotation about said hinge axis results in a reactive movement of the other end portion.

* * * * *